R. LAPHAM.
Improvement in Butter-Workers.
No. 126,638.            Patented May 14, 1872.
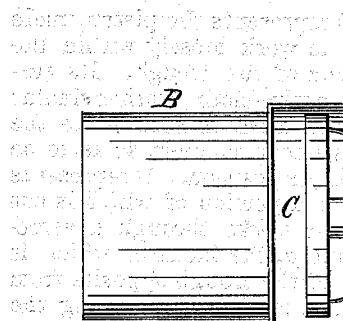
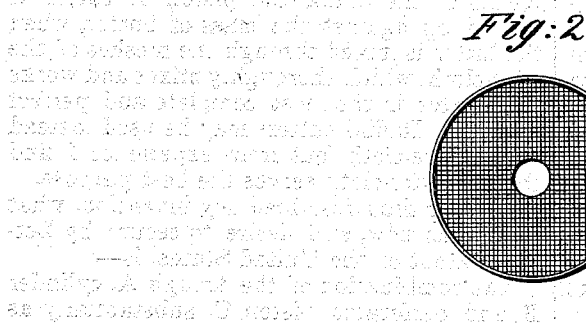
Witnesses
C. Rogers
W. Hurd
Alex Hanroot
Inventor
Rufus Lapham
per his attorney
Charles Rogers

UNITED STATES PATENT OFFICE.

RUFUS LAPHAM, OF NEW YORK, N. Y., ASSIGNOR TO PAUL P. TODD, OF SAME PLACE.

IMPROVEMENT IN BUTTER-WORKERS.

Specification forming part of Letters Patent No. 126,638, dated May 14, 1872.

*To all whom it may concern:*

Be it known that I, RUFUS LAPHAM, of the city, county, and State of New York, have invented new and useful Improvements in Apparatus for Working Butter; and I do hereby declare that the following is a full, clear, and exact description thereof, reference being had to the accompanying drawing and to the letters of reference marked thereon making a part of this specification.

My invention has for its object an improved apparatus for working butter. The nature of this invention consists in the combination and arrangement of a trough or box, at one end of which is a cylinder of nearly or about the same size of the trough, which is also cylindrical on the bottom, with a piston that fits the bottom of the trough and cylinder. The rod of the piston is provided with a screw-thread, that works through a corresponding nut located at the opposite end of the trough from the cylinder. The piston's surface or area is covered with wire-cloth.

To enable others skilled in the art to make and use my invention, I will proceed to describe its construction and operation.

Figure I is a top plan view of my improved apparatus. Fig. II is a plan view of the piston or cutter.

Letters of like name and kind indicate like parts in each of the figures.

A represents a trough, made of any suitable materials and of any desired dimensions, cylindrical in form at the bottom and of a rectangular form at the top. B is a cylinder, the sides and bottom of which are a continuation of the trough. C represents the piston, made to fit closely, but to work loosely within the cylinder and bottom of the trough. Its surface is covered with wire-cloth or other similar material. The wire-cloth is secured to the piston in any convenient manner, so as to be rigid and secure in its position. D represents the shaft or rod, on a portion of which is cut a screw-thread that works through a corresponding screw-nut, a, the latter of which is secured in the end of the trough opposite from the cylinder. E is a crank for operating the piston or cutter.

The operation of this apparatus is simple, easy, and effective, consisting simply in turning the piston or cutter out of the cylinder, so as to bring it well into the trough when the butter is placed within the cylinder, and by means of the crank the piston or cutter is turned up against the mass of butter, when the latter is forced through the meshes of the wire-cloth, which thoroughly mixes and works the butter in the most complete and perfect manner. Radial cutters may be used instead of the wire-cloth, but from experience I find that the wire-cloth serves the best purpose.

Having thus described my invention, what I claim as new, and desire to secure by Letters Patent of the United States, is—

The combination of the trough A, cylinder B, and perforated piston C, substantially as described.

RUFUS LAPHAM.

Witnesses:
 CHAS. ROGERS,
 ISAAC COLEMAN.